United States Patent [19]
Del Campo Aguilera

[11] Patent Number: 5,289,994
[45] Date of Patent: Mar. 1, 1994

[54] EQUIPMENT CARRYING REMOTE CONTROLLED AIRCRAFT

[76] Inventor: Juan Del Campo Aguilera, Avenida de Baviera 4., 28028 Madrid, Spain

[21] Appl. No.: 855,254

[22] Filed: Mar. 23, 1992

Related U.S. Application Data

[63] Continuation-in-part of Ser. No. 593,690, Oct. 5, 1990, abandoned.

[30] Foreign Application Priority Data

Oct. 10, 1989 [ES] Spain ................ 8903414

[51] Int. Cl.⁵ .............................. B64C 29/00
[52] U.S. Cl. .................. 244/7 B; 244/17.21; 244/17.23; 244/12.1; 244/7 R; 244/87
[58] Field of Search ............. 244/2, 6, 7 B, 7 R, 244/17.23, 17.25, 23 B, 12.5, 66, 190, 12.1, 12.4, 136, 87, 17.21

[56] References Cited

U.S. PATENT DOCUMENTS

| | | | |
|---|---|---|---|
| 2,479,125 | 8/1949 | Leonard | 244/7 B |
| 2,622,826 | 12/1952 | Prince | 244/7 B |
| 2,712,420 | 7/1955 | Amster et al. | 244/87 X |
| 2,859,003 | 11/1958 | Servanty | 244/12.1 |
| 3,116,040 | 12/1963 | Petrides et al. | 244/7 B |
| 3,470,765 | 10/1969 | Campbell | 244/17.23 X |
| 3,933,324 | 1/1976 | Ostrowski | 244/17.23 |
| 4,090,567 | 5/1978 | Tomlinson | 244/136 X |
| 4,598,887 | 7/1986 | Jordan | 244/12.1 X |

Primary Examiner—Margaret A. Focarino
Assistant Examiner—C. Mattix
Attorney, Agent, or Firm—Mason, Kolehmainen, Rathburn & Wyss

[57] ABSTRACT

It works like a helicopter in vertical flight or like an airplane in horizontal flight, being able to land accurately on a small area. It is equipped with a rotor, a couple of wings fitted with ailerons and other control surfaces actuated differentially, with support wheels at their ends. It has a vertical stabilizer at the end of which there is a wheel. It has a horizontal stabilizer with elevators that are actuated simultaneously or differentially. It incorporates a propeller ahead of the rotor.

1 Claim, 4 Drawing Sheets

EQUIPMENT CARRYING REMOTE CONTROLLED AIRCRAFT

CROSS REFERENCE TO RELATED APPLICATION

This application is a continuation-in-part of application Ser. No. 07/593,690 filed Oct. 5, 1990, now abandoned.

BACKGROUND OF THE INVENTION

1. Field of the Invention

This invention, as expressed in the heading of this descriptive memorandum, consists of a remote controlled aircraft designed to transport equipment, that takes off and lands like a helicopter and can fly like an airplane in horizontal flight, being able to land accurately on a small area.

The possibility of installing different equipment in the invention enables it to be used in many civilian and military missions, such as those of traffic control, search for forest fires or faults in oil pipelines or electric power lines, surveillance of coasts and borders, correction of artillery fire, detection and blinding of enemy radars, localization of targets, etc.

Therefore, the invention can fly both like an airplane or a helicopter, this not only at take-off and landing, but also in any other circumstance that may require its immobility above or near the objective to be observed, surveyed or attacked.

2. Background of the Prior Art

Since the mid-40's and until the present day, there have been many attempts to build aircraft which, while being able to take-off and land vertically, could also fly like airplanes with lift produced by more or less conventional wings, in order to achieve a higher flying velocity with a lower fuel consumption than helicopters and thus longer flight time and a wider radius of operation.

In the first attempts, take-offs and landings were carried out with the fuselage of the aircraft in a vertical position and the transition to flying like an airplane was done by rotation of the unit itself until the fuselage reached a horizontal position.

Among these attempts we may point out those related to the use of turboshaft motors driving counterrotating propellers long enough (in diameter) to sustain the aircraft in a vertical position during take-off and landing, providing the thrust needed for horizontal flight. With this method they managed relatively reasonable take-offs, but not very satisfactory landings, due on the one hand, to the poor visibility of the ground pilot had when the fuselage was in a vertical position, and on the other hand, to the lack of capability of the propellers providing lift to supply control as compared to that of a conventional rotor.

After these attempts and some others which used jets with enough thrust to sustain the plane during take-off and landing, changes led to the idea of performing these maneuvers with the plane in the normal position for horizontal flight, by either using different systems to provide lift at take-off and landing (rotors or jets) from the ones used to provide thrust in horizontal flight; or else not rotating the whole aircraft to perform the transition from vertical to horizontal flight, but only certain parts of the aircraft, such as the motors themselves, or the jets head pipes, or the rotor axes, which provide alternately, depending on their position, lift for take-off and landing or thrust in horizontal flight.

The idea of using different systems to provide lift and thrust does not only make the product more expensive, but also reduces the payload. This is why, quite often, combined methods have been used in which the parts which provide lift during take-off and landing also cooperate in horizontal flight with those other parts which provide the thrust.

As for the method of rotating certain parts of the plane, such as the motors, rotors or head pipes, it is thought that the more relatively important the moving parts are, the more expensive, heavier and prone to failures the solution will be.

As confirmation of the above-mentioned, we have the fact that in specific reference to existing unmanned vertical take-off and landing aircraft, there are now several types in use with two coaxial rotors, which act as helicopters both at take-off and landing and during flight and an aircraft is nearing the end of its development now, which has two rotors set at the ends of its fixed wing which are driven via mechanical transmissions from a central motor and which, as we said when talking about manned aircraft, can provide lift with their axes in a vertical position and thrust if they are rotated to a horizontal position.

BRIEF SUMMARY OF THE PRESENT INVENTION

In order to resolve the above-mentioned shortcomings, the invention does go back to the method utilized in the first attempts to build aircraft which, as mentioned in the Background of the Invention, while being able to take-off and land vertically with the fuselage in a vertical position and sustained by counter-rotating propellers, can also fly horizontally like airplanes, with the fuselage in a horizontal position, the thrust provided by said propellers and the lift produced by conventional wings, the transition from vertical to horizontal flying being done simply by rotation of the aircraft itself.

The failure of this method, utilized in the years 1950-1955 by aircraft as the Lockheed XFV-I Salmon and the Convair XFY-I "Pogo" (to which mention can be added the disclosure by Amster et al., U.S. Pat. No. 2,712,420 of Jul. 5, 1955 that also has dual counterrotating propellers), was mainly due to the lack of capability of the propellers providing lift to supply control as compared to that of a conventional rotor, namely during the landing performance. To avoid this inconvenience, in the invention has been substituted one of the counter-rotating propellers by a counter-rotating conventional rotor, obtaining not only the possibility to exert an adequate control of the aircraft, but also the additional advantages to be explained later, to require less power to perform the take-off, to attain a better distribution of the induced velocity and, with this, a greater efficiency of the whole unit.

Thus, the equipment carrying remote controlled aircraft of the invention has a fuselage on which, near the front part, there are the propeller and the counterrotating rotor with hinged blades, which has a greater diameter than that of the propeller. Further back on said fuselage and coming out from the sides, there are a set of sweptback wings with ailerons and other control surfaces which can be actuated differentially. At the end of the wings there are two wheels to support the aircraft on the landing area. These two wheels are helped by a third wheel placed at the end of a vertical stabilizer, set so that the three wheels mentioned correspond to the vertex of an imaginary equilateral triangle placed on a plane normal to the longitudinal axis of the aircraft and centered in relation to it.

The fuselage houses the motor group, the fuel tank, power operated controls, communication and navigation equipment, auto-pilot and television, optional equipment, as well as a winch to release and rewind a cable destined to be fastened to a point of the landing area that comes out through a hole made for such purpose in the back of the fuselage, which also has an inferior or ventral cupola 8 to house suitable observation and detection equipment.

Between the wings and the rotor there is a horizontal stabilizer with elevators which can be actuated simultaneously or differentially.

The wheels set at the end of the wings and of the vertical stabilizer are self-orientated, and they are linked to the structure directly or through absorbers.

The wings are set at a very large dihedral angle to the horizontal plane, their span being similar to that of the vertical stabilizer.

The remote control of the aircraft is made through a conventional radio command guidance system which, utilizing "off-the-shelf" components, includes a two-way data-link, uplink for command signals to be transmitted to the corresponding servocommands of the propeller pitch, rotor feathering, motor throttle and control surfaces steering; downlink for sensor information concerning to the aircraft attitude, vertical acceleration, horizontal and vertical airspeeds, vision of the ground and all that related with the mission to be executed. To reduce the workload of the ground pilot, it can be endowed with an auto-stabilizer providing wing leveling and height and heading hold and also, with an autopilot that, utilizing memorized commands, can allow the realization of pre-programmed flight.

BRIEF DESCRIPTION OF THE DRAWINGS

For a better understanding of the present invention, reference should be had to the following detailed description taken in conjunction with the drawings, in which.

DETAILED DESCRIPTION OF THE INVENTION

Figure 1:
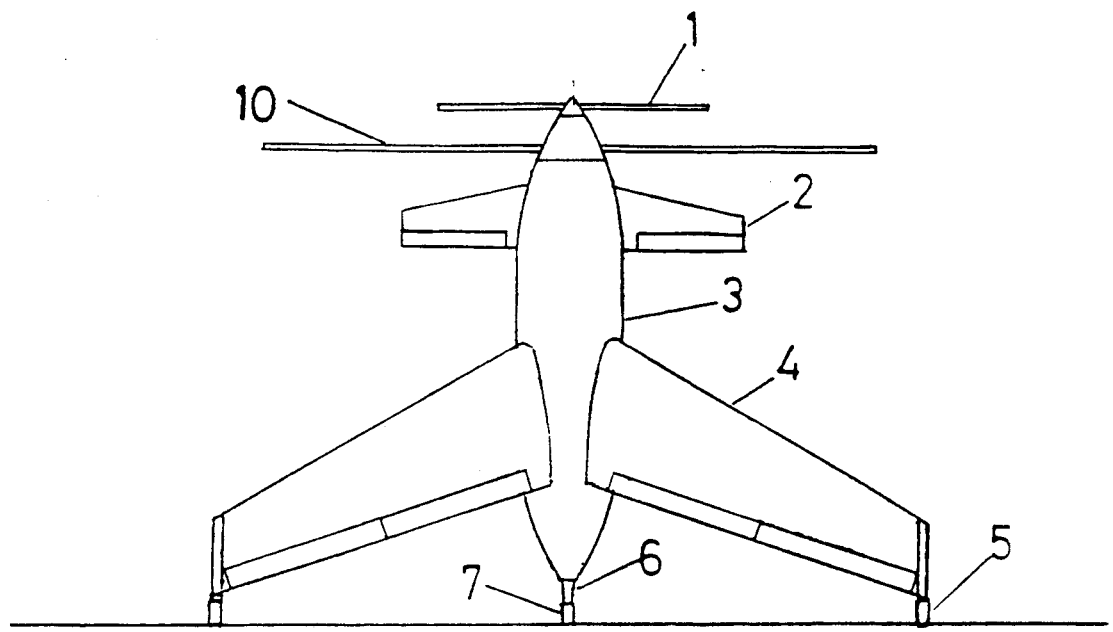
FIG. 1 shows a view of the aircraft settled on the landing area, represented by the horizontal line upon which the three wheels of the aircraft are based.

The aircraft has a conventional variable pitch propeller 1 and a conventional counter-rotating rotor 10 which also acts as a thruster propeller in horizontal flight and whose blades have flapping, lagging and feathering hinges. The feathering motion is controlled by a conventional swashplate mechanism.

The propeller 1 and the rotor 10 are connected between themselves by means of a gear box that maintains constant the relation between its opposite rotating speeds. This relation will be adequate to maintain the difference between the torques required by the propeller and the rotor as small as possible during take-off and landing, with the aid of the independent controls of the pitch of the propeller and of the feathering of the rotor.

The fact that the diameter of the propeller 1 is smaller than that of the rotor 10 is due mainly to that the blades of the propeller have to support at their roots a bending moment which is eliminated in the blades of the rotor by the articulation of flapping.

The combination propeller-rotor has the following advantages: first, as it appears in the Summary of the Invention, the rotor addition makes it possible to supply an adequate control of the aircraft when in vertical position and during the transition to horizontal flight; secondly, the rotor being of bigger diameter than the propellers used on the first aircraft of this type, the disk loading and, therefore, the induced power required for vertical flight are lower; next, being the diameter of the propeller smaller and lacking of flapping hinges, the distance between propeller and rotor can be lesser than using counter-rotating rotors of the same diameter; and, finally, working the propeller in the area where the rotor is less effective makes it possible to optimize the induced speed, and, as a consequence, the efficiency of the whole, for such different conditions as providing lift in vertical flight, when speed is small or negative, or thrust in horizontal flight, when speed is much bigger, using the independent controls of pitch and feathering.

The aircraft has a horizontal stabilizer 2 whose position corresponds to the disposition of a "CANARD" type aircraft, provided with elevators which can be actuated simultaneously or differentially.

The fuselage 3 of the aircraft houses: the cyclic and collective controls of the rotor; the motor group; the fixed communication, navigation, power operated controls, auto-pilot and television equipment; the optional equipment suitable for each mission; the fuel tank, in a position near the center of gravity; a winch to release and rewind a cable through the rear hole 9; the battery and the ballast necessary to place the center of gravity in a suitable position, depending on the optional equipment in use.

The devised aircraft also has wings 4 with conventional ailerons and other control surfaces on the position generally taken up by flaps, but which can be actuated differentially.

The aircraft has two wheels 5 set at the end of the wings 4, linked to their structure either directly or through absorbers.

The said wheels 5 are either self-orientated or with the orientation as shown in the figures.

In the lower part of the fuselage 3 a vertical stabilizer 6 has been placed, which appears almost hidden by the fuselage 3 in FIG. 1.

At the end of the vertical stabilizer 6 a third wheel 7 has been placed which can have the same characteristics as the other two wheels 5 already described, that is to say, it can be linked to the structure either directly or through an absorber. It can be either self-orientated or remotely controlled, in which case, if the other two wheels are orientated as the figure shows, it will be possible for the aircraft to land like an autogyro in case of the engine stop, at a descent velocity appreciably lower than that of vertical descent in auto-rotation.

Figure 2:
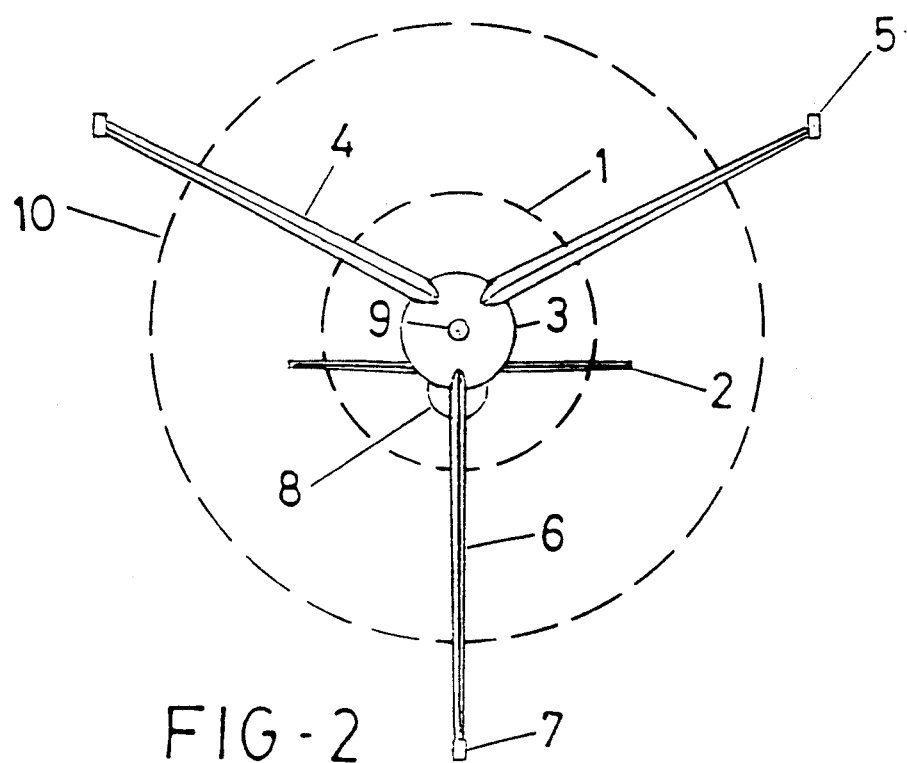
FIG. 2 shows a rear view of the aircraft in horizontal flight, the propeller and the rotor being represented by two circumferences.

FIG. 2 shows the propeller 1 and the counterrotating rotor 10 schematically represented by the circumferences described by the tips of its respective blades.

In FIG. 2 it can be appreciated that the large dihedral of the wings 4 and the abnormal length of the vertical stabilizer 6, are necessary in order to make the two wheels 5 and the wheel 7, placed at their respective ends, appear in the vertex of an imaginary equilateral triangle, placed on a plane normal to the longitudinal axis of the aircraft and centered in relation to it, and whose apothem is equal or larger than the height of the center of gravity of the aircraft over the landing surface, in order to achieve maximum stability when the aircraft rests on them, especially when landing.

Figure 3:
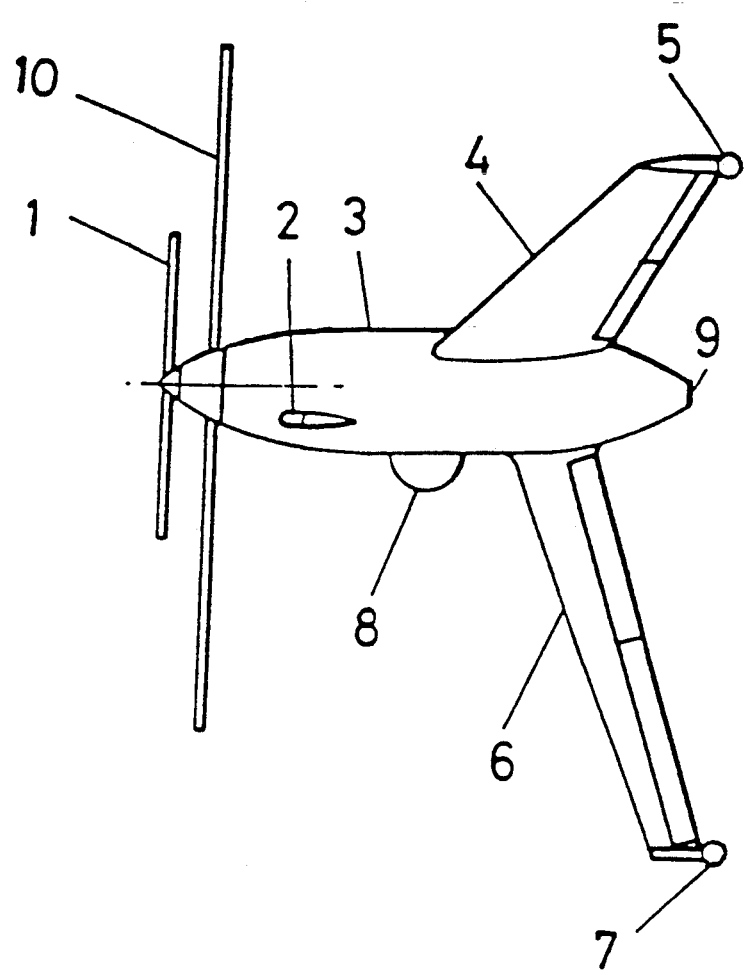
FIG. 3 shows a side view of the aircraft in horizontal flight.

In FIG. 3, that shows a side view of the aircraft in horizontal flight, it can be appreciated the longitudinal position of the ventral cupola 8, the vertical stabilizer 6 and, on this element, the two control surfaces placed on its rear side. It can also be appreciated that the effects on flight of the large dihedral of the wings and the abnormal length of the stabilizer are compensated in what refers to the momentum balance in relation to the longitudinal axis of the aircraft in case of side winds, utilizing for it an adequate proportion between the chords of the wings and that of the stabilizer.

The reason why both the wings and the stabilizers have been provided with large control surfaces is that since they can all act in the slipstream of the counterrotating propeller 1 and rotor 10, their deflection in the suitable direction (differential in the symmetrics) can contribute to balance the reaction of the torque in relatively short periods of operation like a helicopter, periods in which ascent speed, positive or negative, is very low or nonexistent.

Figure 4:
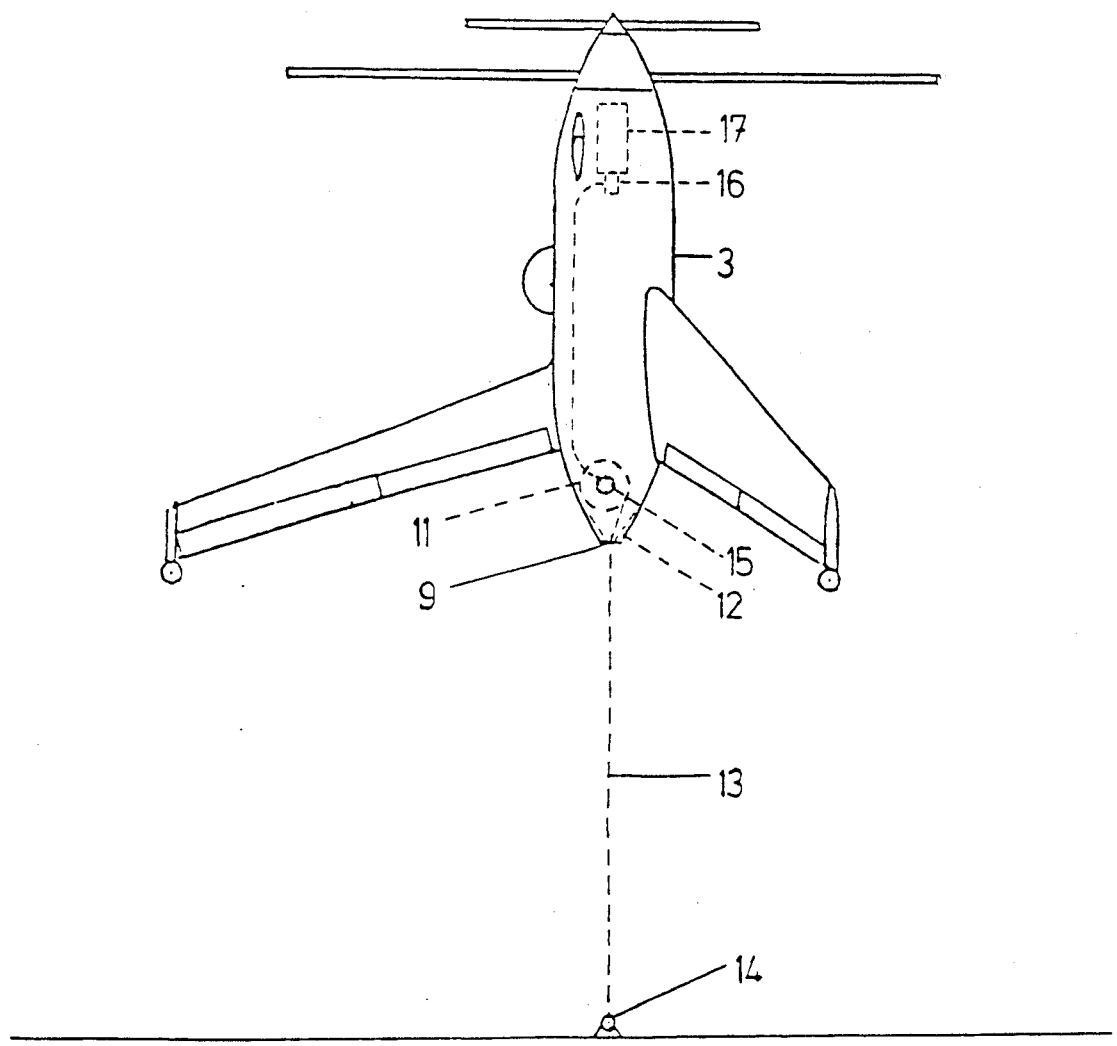
FIG. 4 shows a side view of the aircraft landing in vertical position, with the cable fastened to the landing area to improve the accuracy and security of the approximation to the same.

FIG. 4 shows the aircraft in the last phase of the landing when the cable 13, released by the winch 11 through the guide cone 12 and the rear hole 9 of the fuselage 3, has been fastened by the ground crew to the point 14 of the landing area, to improve the precision and safety of the final approach by using the tension applied to the cable by the winch to stabilize said approach.

The attachment of the winch 11 to the structure has been done in a flexible way, to avoid breakage of the cable 13 or damage to the mechanism or to the structure itself if, because of a strong jerk, a reasonable limit is exceeded.

To get the aircraft coming down, the traction of the cable plus the weight of the aircraft itself must be higher than the lift provided by the propeller-rotor combination, which depends upon the pitch and feathering of said elements and of the power supplied by the engine, governed by the throttle. As the response to the pitch and gas controls is slow and not precise, it is considered advisable to move the winch by an electrical motor 15 fed by a generator 16 driven by the engine 17. Therefore, when the electrical motor of the winch is actuated, the power absorbed by it is subtracted through the generator, proportionated from the engine to provide the lift, unifying so in a single action with a quick response, the possibility to modify the vertical speed. To increase the effectiveness of this action, the generator should be only connected to the motor of the winch during this phase of the landing.

Figure 5:
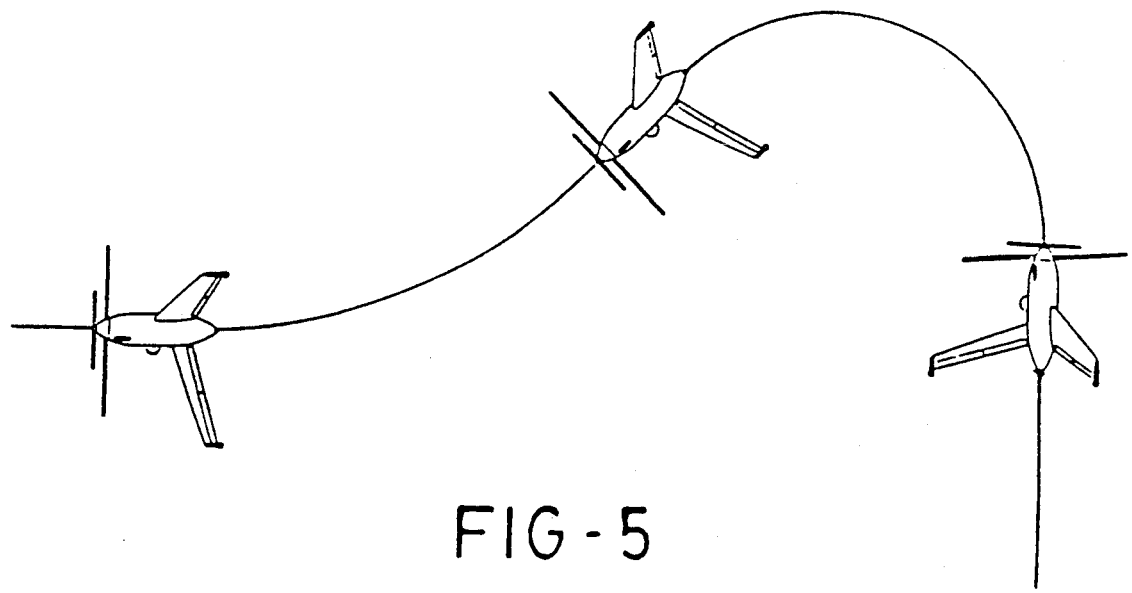
FIG. 5 is a graphic illustration of a flight path of the aircraft during a vertical take-off and transition to horizontal flight.

The take-off is made with the aircraft in vertical position, acting like a helicopter, in which position the aircraft ascends vertically until reaching speed and height enough to safely make the transition to horizontal flight as described below and illustrated in FIG. 5.

To start the transition, the cyclic pitch of the rotor is actuated so that it provides a component of force normal to the aircraft axis and, consequently, its attitude changes with respect to the vertical, the path being curved because the vertical speed decreases and the horizontal increases accordingly as the aircraft changes its pitch attitude and therefore the direction of the rotor thrust.

On annulling the vertical speed it is possible that the aircraft has not reached the necessary horizontal speed to fly like an airplane unless the propeller group has been overpowered sufficiently higher than required to take-off in vertical flight to a height at which the transition is started. If this is the case, a descending branch of the path will be started from a horizontal tangent, still utilizing the cyclic pitch control of the rotor to keep it until reaching the proper speed for the flight like an airplane. From this moment, the actuation of the cyclic pitch of the rotor to maneuver the aircraft will no longer be necessary since the command surfaces thereof will already be effective.

Figure 6:
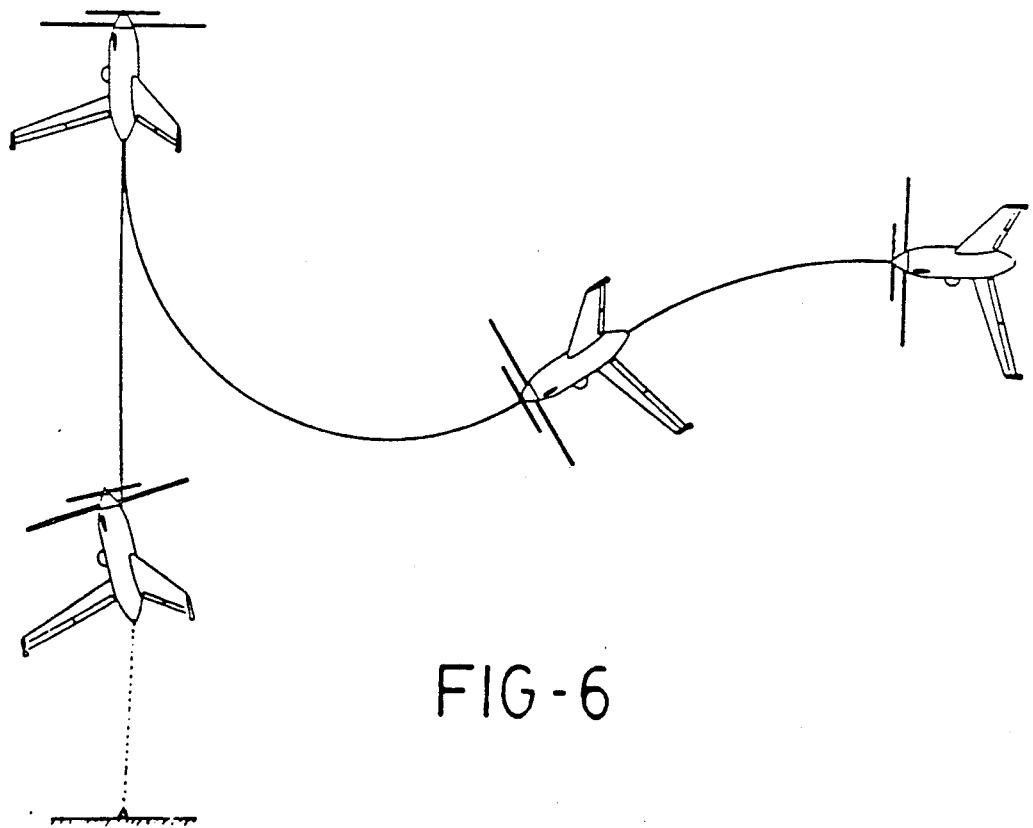
FIG. 6 is a graphic illustration of a flight path of the aircraft during a transition from horizontal flight to vertical descent for landing.

The transition of the flight like an airplane to vertical flight like a helicopter will be made as illustrated in FIG. 6 by starting a descent path which will be maintained until reaching the necessary speed to effect, acting still like an airplane, an ascending maneuver to reach the vertical, being able from such a position to maneuver like a helicopter by driving the cyclic pitch control of the rotor, or to start the landing, reducing the thrust thereof.

The lower part of FIG. 6 illustrates an advisable way to move the cyclic pitch control of the rotor in case of an existing horizontal wind, to incline the aircraft against such a wind enough to attain a component of opposite force to allow the descent by a nearly vertical path. This action may be efficiently supplemented by the use of a cable emerging from the lower orifice in the fuselage, fastened at the outer end to the ground or to a pulling winch, if available, as may be in the case of landing over a small-tonnage vessel with a space available for landing of very reduced dimensions.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters patent of the United States is:

1. An equipment carrying, remote controlled aircraft designed to operate like a helicopter in vertical flight and like an airplane in horizontal flight, and which can also land accurately on a small area;

said aircraft including a fuselage:
a variable pitch propeller and a helicopter type, counter-rotating rotor fitted with hinged blades mounted near the front of said fuselage, said rotor acting as a thruster propeller during horizontal flight;
engine means for driving said propeller and said rotor including throttle means for controlling the same;
a set of sweptback wings spaced further back on said fuselage from said propeller and rotor extending laterally outwardly of said fuselage and forming a large dihedral angle therewith and with a horizontal plane while the airplane is in horizontal flight;

ailerons on said wings and other control surfaces which can be actuated differentially for controlling the direction of flight of said aircraft;

wheels to support said aircraft upon a landing area mounted at the end of said wings;

a vertical stabilizer of large span similar to that of said wings having a third wheel cooperating with said wheels on said wings and set in such a way that all three of said wheels are positioned at the corners of an imaginary equilateral triangle, whose apothem is equal to or larger than the height of a center of gravity of said aircraft over a landing surface, while landing, said wheels being placed on a plane normal to the longitudinal axis of the aircraft and centered in relation to said axis;

elevators between said wings and said rotor that can be actuated simultaneously or differentially;

a ventral cupola for housing observation and detection instruments;

an electric motor powered winch inside said fuselage for releasing and rewinding a cable adapted to be fastened to a point on the ground to improve the precision of a landing, said cable protruding through a guide cone and a hole at the back of said fuselage;

variable power means for driving said winch to release and rewind said cable without the necessity of actuating said combination of said propeller and rotor or said throttle means of said engine;

a generator driven by said engine means actuating said electrical motor of said winch so that an increment of power administered to said winch will be subtracted from engine power destined to provide lift for said aircraft in a vertical position during landing for obtaining a greater and more rapid control effect on the variation of sinking speed when the generator is only connected to said electric motor of said winch during landing.

* * * * *